United States Patent Office 3,006,921
Patented Oct. 31, 1961

3,006,921
TRIFLUOROMETHYL SUBSTITUTED
PHTHALOCYANINES
Viktor Weinmayr, Landenberg, Pa., assignor to E. I. du Pont de Nemours and Company, Wilmington, Del., a corporation of Delaware
No Drawing. Filed Dec. 31, 1957, Ser. No. 706,235
11 Claims. (Cl. 260—314.5)

This invention relates to a novel series of metal phthalocyanine derivatives which are soluble in organic solvents such as acetone, alcohol, benzene and pyridine. For simplicity of reference, acetone will be used hereinafter as typical of said group of organic solvents, and a substance will be considered as soluble in this standard, if it dissolves therein to the extent of at least 0.1% by weight at 20° C., although some of the compounds discussed hereinbelow will dissolve to an extent as high as 10% or even higher.

As is well known, metal phthalocyanines such as copper phthalocyanine, nickel phthalocyanine or cobalt phthalocyanine, are pigments, characterized by their extreme insolubility in water and in organic solvents. In the case of acetone or benzene, for instance, not enough of said pigments can be dissolved therein, whether at room temperature or at the boiling point of the solvent, to give a perceptibly colored solution. The same is true of most nuclearly substituted derivatives of said compounds, such as nitro, amino, halogeno, alkoxy, phenyl, phenoxy, anilino, etc. Sulfonated copper phthalocyanine is soluble in water if the degree of sulfonation is high enough; but phthalocyanine derivatives soluble in organic solvents have been scarce.

In U.S.P. 2,225,441, copper phthalocyanine containing up to two trifluormethyl groups ($CF_3$) in each of the four benzene nuclei have been described, but like the other substitution derivatives above mentioned, they are insoluble in organic solvents.

In U.S.P. 2,227,628, fluorinated copper phthalocyanine containing up to 7 fluorine atoms per molecule and polychloropolyfluoro copper phthalocyanines have been described. But these compounds again are pigments, insoluble in water and in organic solvents.

In the case of chlorinated derivatives, copper phthalocyanines having various Cl contents, from 0.5 atom (on the average) to 15.5 or even 16 atoms per molecule have been known for a long time. But in their solubility characteristics they are true to the rule: They are insoluble in water and in organic solvents.

This invention is based on the amazing discovery that metal-phthalocyanines containing both $CF_3$ groups and halogen substituents, there being at least two $CF_3$ groups and two halogen atoms per molecule, are soluble in organic solvents, as typified by a solubility of at least 0.1% by weight in acetone and often rising to more than 10%. This is true particularly where the nuclear halogen is fluorine, chlorine or bromine. (In other words, it has an atomic number not exceeding 35.)

Accordingly, this invention embraces as its principal object the production of novel compounds which may be expressed by the general formula

(I)

wherein MPc designates the molecule of a metal phthalocyanine, M being a metal of the group consisting of copper, nickel and cobalt, X designates halogen selected from the group consisting of fluorine, chlorine and bromine, and $x$ and $y$ are numerals, each not less than 2. A further object of this invention is to provide practical processes for synthesizing compounds of the above formula. Various additional objects and achievements of this invention will appear as the description proceeds.

My preferred process for manufacturing said compounds comprises heating a polycarboxy metal-phthalocyanine of the formula

(II)

in a mixture of sulfur tetrafluoride and hydrogen fluoride in a sealed vessel, at a temperature of 100° to 175° C., for a convenient length of time, say 1 to 8 hours. In this formula, MPc, X and $x$ have the same significance as above, $z$ may have a value from zero to $(16-x)$ inclusive, and the benz positions not substituted by X are occupied by hydrogen. In other words, the initial metal-phthalocyanine compound may contain no halogen at all, or it may have up to 12 or 14 atoms per molecule. Economic availability of initial material will generally limit $x$ to 4.

The process above outlined not only converts the COOH groups into $CF_3$ groups, but also tends to introduce fluorine into the benz rings. As a consequence, $y$ in the final product (formula I above) will generally be greater than $z$ in the initial material (Formula II), provided $z$ is not near its upper limit of $(16-x)$.

Furthermore, where the initial material has no halogen at all or only a low content thereof, the product of the autoclaving treatment may be subjected to halogenation in known manner to introduce additional halogen atoms into the nuclei, which halogen atoms may be chlorine, bromine or more fluorine.

Finally, my novel compounds may also be obtained by synthesizing the phthalocyanine molecule from lower initial material, say a phthalonitrile, phthalic anhydride or phthalimide, which already possesses in its nucleus a $CF_3$ group and a halogen atom. In such cases (except where the initial material is an orthodinitrile) the known urea process of synthesis is applied (U.S.P. 2,197,458 and 2,214,477) and the process, of course, includes a salt of the desired metal (say $CuCl_2$), urea, an ancillary agent, a diluent, etc.

It will be clear from the aforegoing available methods of synthesis that $X_y$ in the formula of the product is not limited to representing a single halogen; instead, it may represent various combinations of Cl and F, Br and F, or Cl, Br and F, whose total number per molecule is $y$.

The quantities of $SF_4$ and HF to be employed in my preferred process above set forth may vary from 1 to 10 parts (by weight) of $SF_4$ and from 0.5 to 50 parts of HF per part of initial polycarboxy metal phthalocyanine. The preferred duration of the heating is best determined by experiment and observation of the results. One hour will give a quantity of acetone-soluble product in some cases, but a longer period generally increases the yield. Two to six hours may be taken as an optimum period for most cases.

The theory of the reaction is not altogether clear to me, and should not be taken in any sense as a limitation upon this invention. But for the sake of making the understanding thereof clearer, I offer the following as a probable hypothesis for the course of the reaction.

The sulfur tetrafluoride acts on the COOH groups, converting them into CF₃ groups, and in combination with HF it acts further on the benzene nuclei to replace some of the H-atoms (if such are still available) by fluorine.

An incidental, equally unexpected, but most valuable property of my novel compounds is that they have increased resistance to oxidation. Thus, whereas copper phthalocyanine is readily oxidized by acidic, aqueous, ceric sulfate solutions at room temperature, and whereas even polychlorinated copper phthalocyanine containing as high as 14 Cl atoms per molecule is quickly oxidized by ceric sulfate solutions upon slight warming, many of the novel compounds of this invention will withstand heating in boiling ceric sulfate solution (110° C.) for several hours without being changed to any perceptible degree.

This valuable collateral property makes my novel compounds useful in many fields where hitherto known phthalocyanine compounds have not been applicable. For instance, inasmuch as the novel compounds of this invention are not attacked by peroxides, they may be incorporated as colorants into monomers which are to be polymerized by the aid of dibenzoyl peroxide or similar catalysts into plastics.

My novel compounds may also be utilized where their solubility in organic solvents shows up to advantage. For instance, they may be applied to textile fibers from organic solvent solution, to produce brilliant blue to green, and usually light-fast dyeings on most of them. They may also be incorporated into inks and lacquers, from which printings can be made exhibiting the exceptional light-fastness and pleasing brilliance of the phthalocyanine colors in general. On the other hand, they may also be used as pigments, like hitherto known phthalocyanines, but with the added advantage that the resulting prints or coatings possess high stability to fading by oxidation.

Without limiting this invention, the following examples are given to illustrate my preferred mode of operation. Parts mentioned are by weight.

*Example 1*

One part of copper phthalocyanine tert(4)carboxylic acid (made by the urea-process from trimellitic acid and cuprous chloride followed by acid-pasting in 98% sulfuric acid), 15 parts of technical anhydrous hydrogen fluoride, and 8 parts of technical sulfur tetrafluoride were charged into a stainless steel bomb which had been cooled in a Dry Ice-acetone mixture and had been swept with nitrogen. The bomb was closed and put into an oil bath where it could be agitated. The temperature of the oil bath was raised to 150° C. over a period of about four hours, and the bomb was agitated at an oil bath temperature of 150° to 155° C. for six hours. After cooling the bomb to room temperature, it was cooled further in iced water and the remaining pressure, mainly due to an excess of sulfur tetrafluoride, was released. The reaction mass was then poured onto about 200 parts of ice, filtered, washed nearly acid free, slurried in 200 parts of dilute aqueous ammonia to neutralize all hydrogen fluoride, filtered and washed again with water, and dried at 80° to 90° C. The deep blue solid thus obtained was extracted with acetone. Upon evaporation of the acetone one part of a blue solid was obtained whose nitrogen and fluorine content corresponded to the formula $Cu(C_8H_2N_2F.CF_3)_4$. This product is stable in boiling 2% aqueous sodium hydroxide.

*Example 2*

Five parts of copper phthalocyanine tetra(4)carboxylic acid (made as described in Example 1, but not acid-pasted), 55 parts of anhydrous technical hydrogen fluoride, and 26 parts of sulfur tetrafluoride were charged into a bomb as described above and heated at 150° to 155° C. for six hours. The crude product was isolated as in Example 1, extracted with acetone, and the acetone was evaporated. 4.5 parts of acetone-soluble product which contained elemental sulfur (7.9%) were obtained. Most of this sulfur was readily removed by an extraction with carbon disulfide in which the reaction product was practically insoluble. Most of the sulfur can also be removed, if desired, by subliming it out of the reaction product at about 100° to 150° C. under vacuum. The analysis of the purified product was essentially the same as that obtained for the product of Example 1 and corresponds approximately with that required for copper tetrafluoro-tetra-(trifluoromethyl)-phthalocyanine. The X-ray pattern of the crystals was similar to that of the alpha copper phthalocyanine.

NOTE.—The significance of the above example is that the initial material had not been acid-pasted. Analytical investigation shows that the immediate reaction product of trimellitic acid and cuprous chloride by the urea process is a mixture of copper phthalocyanines containing in their various benzene nuclei COOH groups and CONH₂ groups, the latter predominating. When the product is acid-pasted, the CONH₂ groups are hydrolyzed to COOH groups, thus converting the product into an essentially uniform copper-phthalocyanine tetracarboxylic acid. But inasmuch as in this example the initial material had not been acid pasted, and inasmuch as the final product was essentially the same as in Example 1, the instant example demonstrates that CuPc containing CONH₂ groups is the full equivalent of tetracarboxy-CuPc for the purpose of the reaction under discussion (i.e. reaction with HF and SF₄ under autogenic pressure).

Upon oxidation with fuming nitric acid of the purified product obtained at the end of Example 2, a compound analyzing as a fluoro-(trifluoromethyl)-phthalimide was obtained (M.P. 135° C. after crystallization from dilute ethanol). A nuclear magnetic resonance analysis of said phthalimide confirmed the presence of a trifluoromethyl group and a fluorine atom and also indicated that probably isomers were present as far as the position of the ring fluorine atom was concerned.

The above acetone-soluble dye is a mixture of products which can be separated by virtue of their different solubilities in benzene. However most of the benzene insoluble fraction may be converted to benzene-soluble products by repeating the reaction with hydrogen fluoride and sulfur tetrafluoride.

Solutions of the blue dye in acetone as high as 10% can readily be prepared at room temperature. The absorption spectra of acetone solutions of the dye shows peaks at mu: 320, 340, 620, and 660. This new acetone-soluble dye is also soluble (either fully or in part) in liquid alcohols, esters, aliphatic and aromatic hydrocarbons, fluorinated organic solvents such as trichloro-trifluoroethane, ethers, and chloroform (but only very poorly soluble in carbon tetrachloride and carbon disulfide), and forms in these solvents solutions of high tinctorial strength. The new dye is soluble in strong sulfuric acid from which it is recovered essentially unchanged by drowning the solution in water. It also sublimes under reduced pressure without material decomposition.

When a sample of the fluorinated product obtained in Example 2 was brought into finely divided form by acid pasting from 100% sulfuric acid, and then heated for 12 hours at 110° C. in a dilute sulfuric acid-ceric sulfate solution, no perceptible decomposition was observed, whereas copper phthalocyanine, as well as copper phthalocyanine tetracarboxylic acid, oxidizes at room temperature in the same oxidizing solution.

*Example 3*

The procedure of Example 2 was repeated in several experiments with the same initial material as in Example 2 (non-acid-pasted), except that the quantities of HF and SF₄, and the temperature and duration of heating were varied as indicated in the following table. The temperatures indicated were those of the oil bath, since no measurements inside the reaction bomb were made. The parts of HF and $SF_4$ indicated are for one part of the initial phthalocyanine compound.

| Exp. | HF, parts | $SF_4$, parts | Time, hours | Temperature, ° C. |
|---|---|---|---|---|
| (a) | 10 | 4.5 | 6 | 100 |
| (b) | 7.5 | 4 | 6 | 175 |
| (c) | 1.2 | 2.6 | 6 | 150 |
| (d) | 7 | 1 | 6 | 150 |
| (e) | 9.1 | 2 | 6 | 150 |
| (f) | 8 | 2.4 | 1 | 150 |

Essentially the same acetone-soluble blue dye, described in Examples 1 and 2, was obtained in each of the tabulated experiments. The yields, however, varied considerably, the higher yields apparently depending on the following optimum conditions: the higher temperature limit, longer reaction time than 1 hour, and the higher quantities of $SF_4$. On the other hand, even the lowest quantity of HF in the above series of experiments seemed sufficient for good yields. But normally very large excesses of HF may be employed to act as a diluent for the mass.

*Example 4*

One part of cobalt tetrachloro phthalocyanine dicarboxylic acid amide (prepared by the urea process from cobalt chloride and equal molar amounts of trimellitic acid and 3,6-dichlorophthalic anhydride), 25 parts of anhydrous hydrogen fluoride and 5 parts of sulfur tetrafluoride were heated at 150° C. under autogenous pressure for six hours. The reaction product was isolated as in Example 1 and consisted of 0.78 part of an acetone-soluble blue solid.

*Example 5*

Twenty-five parts of copper phthalocyanine tetra-(4) carboxylic acid in 35 parts anhydrous hydrogen fluoride were reacted at 150° C. for six hours under autogenous pressure with 80 parts of technical sulfur tetrafluoride. The latter was about 70% pure and contained between 4 and 10 mole percent of chlorine based on total moles of materials present in the technical product. Upon working up as described in Example 1, 15 parts of acetone soluble product were obtained. It dissolved in acetone with a greenish blue color. Based on analysis, a copper tetra(4)trifluoromethyl phthalocyanine was obtained which was substituted in the benzene rings with chlorine and fluorine, assuming that each COOH group had been converted to $CF_3$. The analysis gave a ratio of $$N:Cl:F = 8:4:14.5$$

Upon oxidation with boiling fuming nitric acid, a mixture of mono and dihalogeno-(trifluoromethyl)phthalimides was obtained.

*Example 6*

The procedure of Example 5 was repeated, except that the following quantities were used:

| | Parts |
|---|---|
| Copper-phthalocyanine-tetra(4)carboxylic acid | 10 |
| Hydrogen fluoride (anhydrous) | 60 |
| Sulfur tetrafluoride (technical) | 30 |

Upon drowning the reaction mass on ice, filtering, washing and drying, 7 parts of condensation product were obtained. The product contained N, Cl, F in a ratio of 8:1:16.

Three parts of the reaction product were put into a nickel reaction vessel. After cooling in a dry ice-acetone mixture, 80 parts of anhydrous hydrogen fluoride were added. This was followed by 7 parts of chlorine. The vessel was closed; the temperature of the reaction mass was raised to 25° C., and the charge was agitated at this temperature for six hours. The reaction mass was then poured on ice, the blue green precipitate formed was filtered, and the filter cake was washed acid free and dried. Upon extraction with acetone and evaporation of solvent from the blue green solution, 1.5 parts of a green solid were obtained. It had a ratio of $$N:Cl:F = 8:4:16$$

When this experiment was repeated, except that the chlorination change was agitated at 100° C. for six hours, 1 part of a green solid was obtained analyzing for a ratio of $N:Cl:F = 8:5.1:16$. This solid dissolved in acetone with a green color.

*Example 7*

A mixture of 1.2 parts of a chloro-4(trifluoromethyl) phthalimide (obtained by oxidizing a copper tetrachloro-tetra-(4-trifluoromethyl)-phthalocyanine with nitric acid; compare Example 5), 1 part of 36% hydrochloric acid and 25 parts of nitrobenzene was heated to 170° C. for one hour. After cooling to about 150° C., 4 parts of urea, 0.5 part of cuprous chloride, and 0.1 part of ammonium molybdate were added. The charge was agitated at 150° to 160° C. for three hours, then the temperature was raised to 175° C. and agitation was continued at 175° to 180° C. for six hours. The reaction mass was then cooled, water and hydrochloric acid were added until an acid reaction was obtained, and the solvent nitrobenzene was removed by steam distillation.

The blue solid which precipitated was filtered, washed acid free and dried at 95° C. It was then extracted with acetone in a Soxhlet apparatus, and the resulting deep blue solution was evaporated to dryness. The blue solid thus obtained (0.53 part) was completely soluble in acetone and analyzed as a copper tetrachloro-tetra(4-trifluoromethyl)-phthalocyanine.

An infrared analysis confirmed that the soluble product was the same type of compound as obtainable when a copper phthalocyanine tetra(4)carboxylic acid is reacted with sulfur tetrafluoride containing chlorine (Example 5).

*Example 8*

Ten parts of copper tetra(trifluoromethyl)-phthalocyanine made from 4-trifluoromethyl-1,2-phthalonitrile and copper sulfate, 60 parts of anhydrous hydrogen fluoride and 15 parts of bromine were heated at 150° C. for six hours in a sealed vessel. Upon drowning the reaction mass on ice, filtering, washing, and drying, 6 parts of a blue product were obtained, which formed a deep blue solution in acetone.

It will be understood that the details of procedure may be varied widely within the skill of those engaged in this art. Thus in lieu if copper-phthalocyanine tetracarboxylic acid in the above examples, carboxylated copper phthalocyanine compounds containing less than four COOH groups per molecule may be employed. These may be synthesized by the urea process from cupric or cuprous chloride and mixtures, in appropriately selected proportions, of say trimellitic acid and phthalic anhydride, phthalimide, or nuclearly chlorinated derivatives of the same. If nickel chloride or cobalt chloride is used in lieu of the copper salt, the resulting metal carboxy-phthalocyanine, when carried through the procedures of the above examples, will lead to acetone-soluble derivatives of nickel- and cobalt-phthalocyanine, respectively.

Compounds having fewer than four $CF_3$ groups per molecule, may also be prepared by the procedure of Example 8, except applying it to mixtures of halogenated trifluoromethyl-phthalimide and halogenated or non-halogenated phthalimide which is free of $CF_3$ groups. To insure good solubility, however, in organic solvents, it is recommended to direct the synthesis toward production of compounds having at least two $CF_3$ groups in the resulting metal-phthalocyanine molecule.

In lieu of starting with metal phthalocyanines having carboxy groups in the benz rings, corresponding compounds having other groups which are readily transformable by $SF_4$ and HF into $CF_3$ groups may be selected. As such transformable groups, equivalent to COOH, may be mentioned: carbamoyl: $CONH_2$; cyano: CN; trichloromethyl: $CCl_3$; chlorocarbonyl: COCl; and carboxy ester groups: COOR, wherein R is a lower alkyl group (1 to 4 C-atoms).

The hydrogen fluoride employed in some of the above examples has been specified as anhydrous; in other examples, technical hydrogen fluoride has been named. The latter contains traces of moisture. Thus, anhydrous HF is not an absolute requirement for this reaction, but is a desirable goal from the practical viewpoint, inasmuch as hydrogen fluoride containing water is highly corrosive to equipment.

The reaction mass should contain at least 0.5 part by weight of HF and at least 1.0 part of $SF_4$ per part of the initial metal phthalocyanine compound. But I know of no theoretical upper limit, except the obvious consideration that the larger the excess of either gas employed, the larger the expense of subsequent recovery. Consequently, upper limits of 50 parts of HF by weight and 10 parts of $SF_4$ are recommended as a matter of economy.

I claim as my invention:

1. A metal phthalocyanine of the group consisting of copper phthalocyanine, nickel phthalocyanine and cobalt phthalocyanine and bearing as the only substituents in its molecule from two to four $CF_3$ radicals and at least two halogen atoms of the group consisting of fluorine, chlorine and bromine, said compound being characterized further by being sufficiently soluble in acetone to produce an intensely colored, transparent solution of blue to green color.

2. Polyhalogeno-poly(trifluoromethyl) copper phthalocyanine, wherein the halogen is of atomic number not exceeding 35 and the number of trifluoromethyl radicals is not greater than four.

3. Polychloro-tetra(trifluoromethyl) copper phthalocyanine, the number of chlorine atoms being not less than 4 and not more than 12 per molecule.

4. Tetrafluoro-tetra(trifluoromethyl) copper phthalocyanine.

5. The process of producing an acetone-soluble metal phthalocyanine, which comprises heating together, at a temperature between 100° and 175° C., a metal phthalocyanine compound selected from the group consisting of nonhalogenated metal phthalocyanine polycarboxylic acids, their lower alkyl esters, poly(chlorocarbonyl) metal phthalocyanines, poly(trichloromethyl) metal phthalocyanines, polycarbamoyl metal phthalocyanines, polycyano metal phthalocyanines and nuclear halogen derivatives of any of these and a solution of sulfur tetrafluoride in hydrogen fluoride, whereby to obtain a metal phthalocyanine compound possessing both $CF_3$ groups and nuclear halogen, the prefix "poly" in this claim signifying a number not less than 2 and not greater than 4, the metal being one selected from the group consisting of copper, nickel and cobalt, and said nuclear halogen being one of atomic number not exceeding 35.

6. The process of producing an acetone-soluble copper phthalocyanine, which comprises heating, at a temperature of 100° to 175° C., copper phthalocyanine tetracarboxylic acid in a mixture of hydrogen fluoride and sulfur tetrafluoride, whereby to produce copper tetrafluoro-tetra(trifluoromethyl) phthalocyanine.

7. The process of producing an acetone-soluble metal phthalocyanine compound, which comprises heating an otherwise unsubstituted metal phthalocyanine polycarboxylic acid of the group consisting of copper phthalocyanine polycarboxylic acid, nickel phthalocyanine polycarboxylic acid and cobalt phthalocyanine polycarboxylic acid, the number of carboxy radicals in each case being not less than 2 and not greater than 4, with a mixture of hydrogen fluoride and sulfur tetrafluoride under autogenous pressure and at a temperature between 100° and 175° C., whereby to replace the carboxy groups in said polycarboxylic acid by trifluoromethyl groups, the initial reaction mixture containing at least 0.5 part by weight of hydrogen fluoride and at least 1 part by weight of sulfur tetrafluoride for each part by weight of the metal phthalocyanine polycarboxylic acid.

8. A process as in claim 7, wherein the sulfur tetrafluoride employed contains admixed chlorine, whereby the product obtained in the reaction contains both chlorine and fluorine in addition to $CF_3$ groups.

9. The process of producing copper tetrafluoro-tetra-(trifluoromethyl)phthalocyanine, which comprises reacting one part by weight of copper phthalocyanine tetracarboxylic acid with a mixture containing at least 0.5 part by weight of hydrogen fluoride and at least 1 part by weight of sulfur tetrafluoride, said reaction being achieved by heating a mixture of the reactants, under autogenous pressure, at a temperature between 100° and 175° C.

10. Copper tetrafluoro-tetra(trifluoromethyl)-phthalocyanine containing 1 to 5 chlorine atoms per molecule.

11. Copper tetrachloro-tetra(trifluoromethyl)-phthalocyanine.

References Cited in the file of this patent

UNITED STATES PATENTS

| | | |
|---|---|---|
| 2,061,186 | Cole | Nov. 17, 1936 |
| 2,197,458 | Wyler | Apr. 16, 1940 |
| 2,225,441 | Braun et al. | Dec. 17, 1940 |
| 2,247,752 | Fox | July 1, 1941 |

OTHER REFERENCES

Lubs: Chemistry of Synthetic Dyes and Pigments, Reinhold, New York, N.Y. (1955), pp. 594–596.

Venkataraman: Synthetic Dyes, vol. I (1952), page 473.

Venkataraman: Synthetic Dyes, vols. I and II (1952), pp. 473, 910, 916 and 1221.

UNITED STATES PATENT OFFICE
CERTIFICATION OF CORRECTION

Patent No. 3,006,921                              October 31, 1961

Viktor Weinmayr

It is hereby certified that error appears in the above numbered patent requiring correction and that the said Letters Patent should read as corrected below.

Column 3, line 43, for "tert(4)carboxylic" read -- tetra(4)carboxylic --; column 6, line 7, for "change" read -- charge --.

Signed and sealed this 24th day of April 1962.

(SEAL)
Attest:

ESTON G. JOHNSON
Attesting Officer

DAVID L. LADD
Commissioner of Patents